(12) United States Patent
Lee (10) Patent No.: US 10,386,972 B2
(45) Date of Patent: Aug. 20, 2019

(54) TOUCH PANEL

(71) Applicant: Samsung Display Co., Ltd., Yongin-si (KR)

(72) Inventor: Seung-Rok Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 500 days.

(21) Appl. No.: 15/082,447

(22) Filed: Mar. 28, 2016

(65) Prior Publication Data

US 2017/0160830 A1 Jun. 8, 2017

(30) Foreign Application Priority Data

Dec. 3, 2015 (KR) .......................... 10-2015-0171154

(51) Int. Cl.
G06F 3/044 (2006.01)

(52) U.S. Cl.
CPC .... *G06F 3/044* (2013.01); *G06F 2203/04111* (2013.01)

(58) Field of Classification Search
CPC combination set(s) only.
See application file for complete search history.

(56) References Cited

U.S. PATENT DOCUMENTS

| | | | | |
|---|---|---|---|---|
| 2008/0309633 A1* | 12/2008 | Hotelling | .............. | G06F 3/0412 345/173 |
| 2013/0341651 A1* | 12/2013 | Kim | .................... | H01L 31/0232 257/84 |
| 2014/0132861 A1* | 5/2014 | Wang | ...................... | G06F 3/044 349/12 |
| 2014/0320761 A1* | 10/2014 | Misaki | .................... | G06F 3/044 349/12 |
| 2015/0349773 A1* | 12/2015 | Gourevitch | ........ | H03K 17/9622 200/5 R |
| 2016/0048228 A1* | 2/2016 | Lee | ........................... | B32B 7/12 345/173 |
| 2016/0070382 A1* | 3/2016 | Toyoshima | ............. | G06F 3/044 349/12 |
| 2016/0154462 A1* | 6/2016 | Haga | ...................... | G06F 3/016 345/174 |
| 2016/0231861 A1* | 8/2016 | Nagata | .................... | G06F 3/044 |
| 2017/0059746 A1* | 3/2017 | Tung | ....................... | G06F 3/044 |
| 2018/0143477 A1* | 5/2018 | Chai | ................... | G02F 1/13338 |

FOREIGN PATENT DOCUMENTS

KR 101521775 5/2015

* cited by examiner

*Primary Examiner* — Jose R Soto Lopez
(74) *Attorney, Agent, or Firm* — H.C. Park & Associates, PLC (57) ABSTRACT

A touch panel includes a base substrate, a first pattern, a first insulation layer, a second pattern, and a second insulation layer. The first pattern is disposed on the base substrate. The first pattern includes a driving line extended in a second direction that crosses a first direction and first sensing electrodes that are electrically connected to the driving line and arranged in the second direction. The first insulation layer is disposed on the first pattern and the base substrate covering the first pattern. The second pattern is disposed on the first insulation layer. The second pattern includes a sensing line extended in the first direction and second sensing electrodes that are electrically connected to the sensing line and arranged in the first direction. The second insulation layer is disposed on the second pattern and the first insulation layer covering the second pattern.

17 Claims, 6 Drawing Sheets

TOUCH PANEL

CROSS-REFERENCE TO RELATED APPLICATION

This application claims priority from and the benefit of Korean Patent Application No. 10-2015-0171154, filed on Dec. 3, 2015, which is hereby incorporated by reference for all purposes as if fully set forth herein.

BACKGROUND

Field

Exemplary embodiments relate to a touch panel. More particularly, exemplary embodiments relate to a mutual captive touch panel.

Discussion of the Background

Many mobile devices, such as smart phones, include touch panel sensors. The touch panel sensor may be a capacitive touch panel sensor, a resistive touch panel sensor, or a light sensing touch panel sensor. Among the various types of touch sensors, the capacitive touch panel sensor is used in many mobile devices. The capacitive touch panel sensor detects capacitance changes caused by a touch of an external electric conductor, such as a finger. However, mobile devices having a capacitive touch panel sensor may cause the display screen of the mobile device to have a reflective differences associated with the use of the capacitive touch panel. Thus, the use of capacitive touch panel sensors on mobile devices may degrade the quality of images that are displayed those devices.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch panel reduce display quality degradation due to a reflectance difference.

Additional aspects will be set forth in the detailed description which follows, and, in part, will be apparent from the disclosure, or may be learned by practice of the inventive concept.

An exemplary embodiment discloses a touch panel that includes a base substrate, a first pattern, a first insulation layer, a second pattern, and a second insulation layer. The first pattern is disposed on the base substrate. The first pattern includes a driving line extended in a second direction that crosses a first direction and first sensing electrodes that are electrically connected to the driving line and arranged in the second direction. The first insulation layer is disposed on the first pattern and the base substrate covering the first pattern. The second pattern is disposed on the first insulation layer. The second pattern includes a sensing line extended in the first direction and second sensing electrodes that are electrically connected to the sensing line and arranged in the first direction. The second insulation layer is disposed on the second pattern and the first insulation layer covering the second pattern.

An exemplary embodiment also discloses a touch panel that includes a first pattern, a second pattern, a first insulation later, and a second insulation later. The first pattern includes first sensing electrodes arranged in a second direction that crosses a first direction and electrically connected to each other along the second direction. The first pattern also includes first dummy patterns spaced apart from the first sensing electrodes. The first insulation layer is disposed on the first pattern. The second pattern includes second sensing electrodes arranged in the first direction and electrically connected to each other along the first direction. The second pattern also includes second dummy patterns spaced apart from the second sensing electrodes. Internal edges of the first sensing electrodes define first openings and first shapes of the first openings are coincident with the second dummy pattern. Internal edges of the second sensing electrodes define second openings and second shapes of the second openings are coincident the first dummy pattern.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Generally, a mobile device may have a capacitive touch panel for user input. A capacitive touch panel sensor may detect a touch position using first sensing cells and second sensing cells disposed in a matrix form. However, reflectance differences among where the first and second cells are formed and not formed may cause a stain on a display screen of the mobile device. Thus, mobile devices may suffer from display quality degradation due to the reflectance differences.

Exemplary embodiments provide a touch panel reduce display quality degradation due to a reflectance difference. Hereinafter, the inventive concept will be explained in detail with reference to the accompanying drawings.

Figure 1:
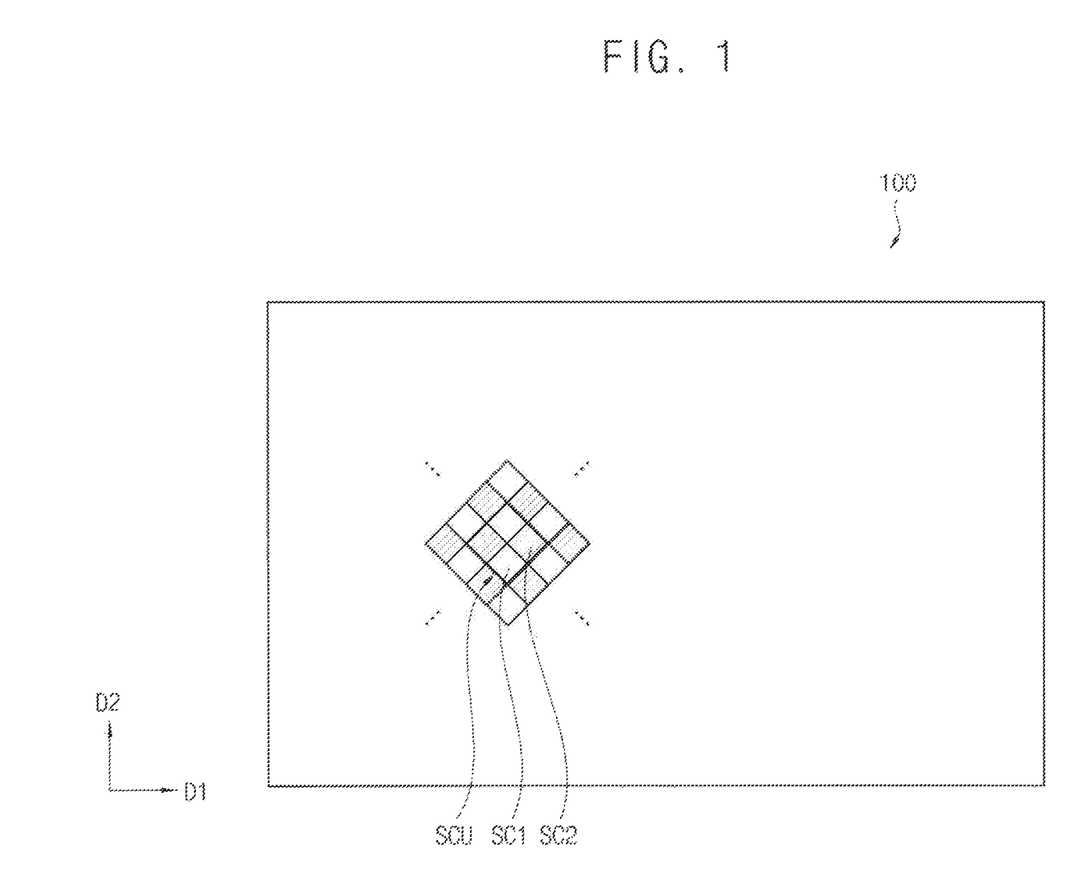
FIG. 1 is a plan view illustrating a touch panel according to an exemplary embodiment.

FIG. 1 is a plan view illustrating a touch panel according to an exemplary embodiment.

Referring to FIG. 1, the touch panel 100 may include unit areas SCU. The unit areas SCU may include a first sensing cell SC1 and a second sensing cell SC2. For example, one of the unit areas SCU may include two second sensing cells SC2 which are arranged in a first direction D1 and electrically connected to each other, and two first sensing cells SC1 arranged in a second direction D2 and connected to each other. The second direction D2 may be substantially perpendicular to the first direction D1.

The first sensing cells SC1 may be electrically connected to each other along a driving line (not shown) which may extend in the second direction D2. The second sensing cells SC2 may be electrically connected to each other along a sensing line (not shown) which may extend in the first direction D1. A capacitance at the touched location may be changed if the external electric conductor, such as a finger or a stylus pen, contacts (i.e., touches) the touch panel at a location corresponding to the touched location. The touch panel may detect the touched location by sensing the capacitance change at that location.

Figure 2A:
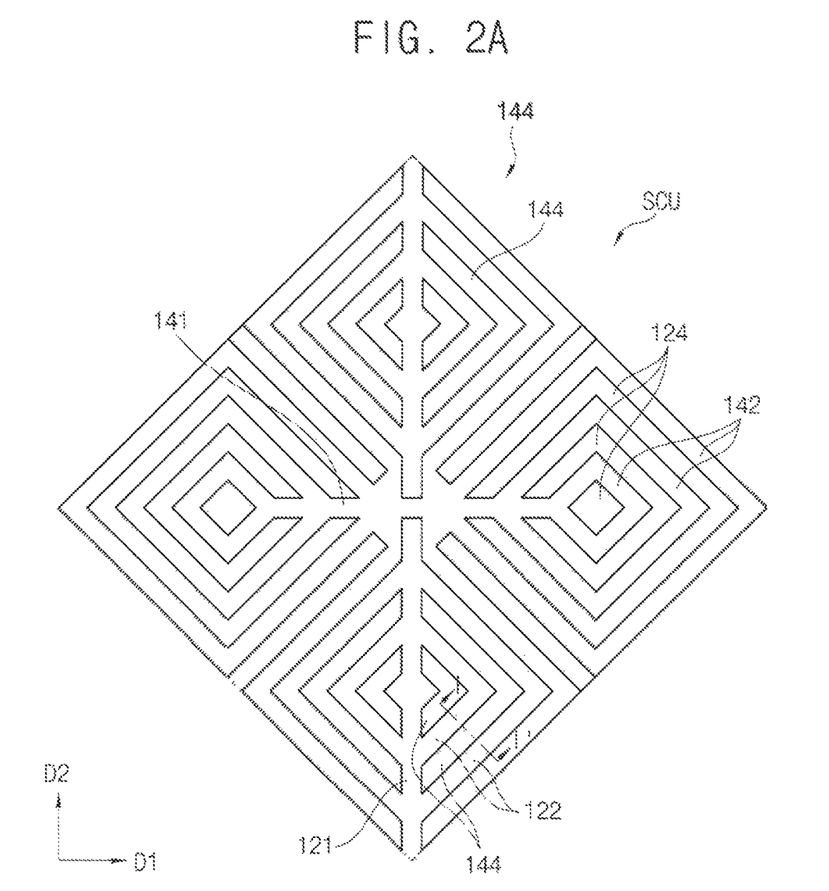
FIG. 2A is a plan view illustrating one unit area of the touch panel of FIG. 1.
Figure 2B:
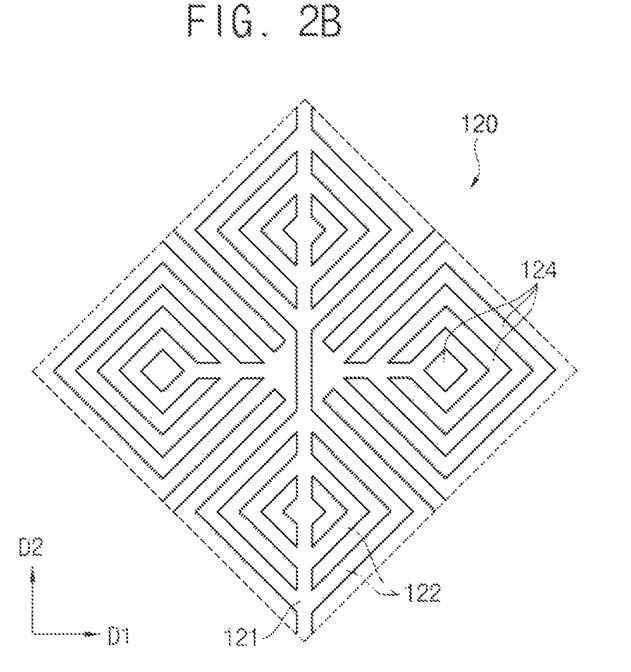
FIG. 2B is a plan view illustrating a first pattern of the touch panel of FIG. 2A.
Figure 2C:
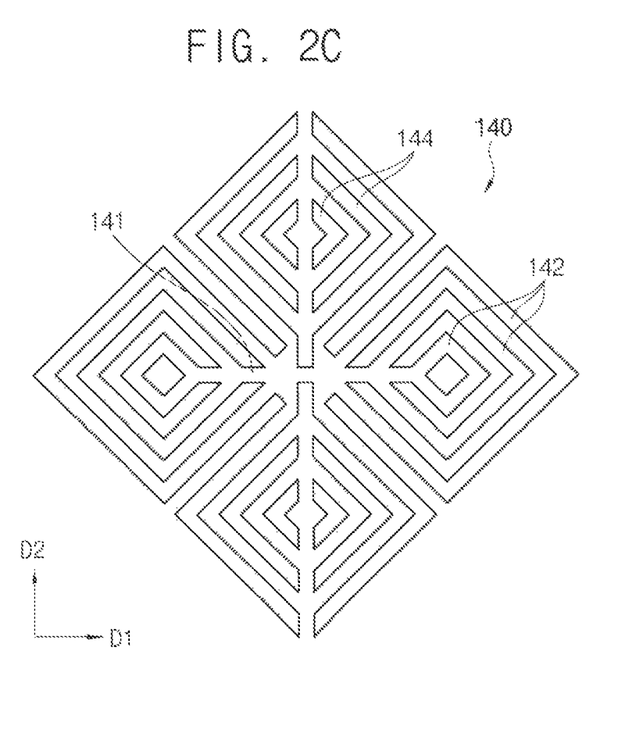
FIG. 2C is a plan view illustrating a second pattern of the touch panel of FIG. 2A.
Figure 3:
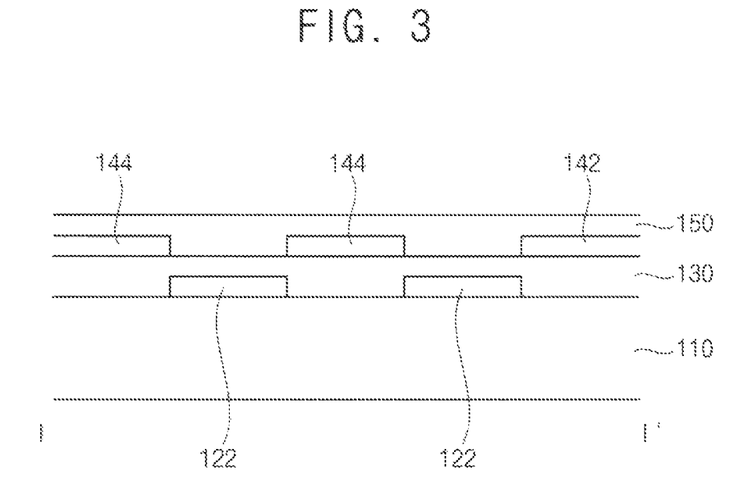
FIG. 3 is a cross-sectional view taken along a section line I-I' of FIG. 2A.

FIG. 2A is a plan view illustrating one unit area of the touch panel of FIG. 1. FIG. 2B is a plan view illustrating a first pattern of the touch panel of FIG. 2A. FIG. 2C is a plan view illustrating a second pattern of the touch panel of FIG. 2A. FIG. 3 is a cross-sectional view taken along a section line I-I' of FIG. 2A.

Referring to FIGS. 2A, 2B, 2C, and 3, the touch panel may include a base substrate 110, a first pattern 120, a first insulation layer 130, a second pattern 140, and a second insulation layer 150. The first pattern 120 may include a first sensing electrode 122, a first dummy pattern 124, and a driving line 121. The first sensing electrode 122 and the driving line 121 may be included in a first sensing cell SC1. The second pattern 140 may include a second sensing electrode 142, a second dummy pattern 144, and a sensing line 141. The second sensing electrode 142 and the sensing line 141 may be included in a second sensing cell SC2. The first dummy pattern 124 may be included in the second sensing cell SC2 and the second dummy pattern may be included in the first sensing cell SC1.

The base substrate 110 may include a transparent insulation substrate. For example, the base substrate 110 may include a glass substrate, a quartz substrate, and a transparent resin substrate. Examples of the transparent resin substrate for the base substrate 110 may include a polyimide-based resin, acryl-based resin, polyacrylate-based resin, polycarbonate-based resin, polyether-based resin, sulfonic acid containing resin, and polyethyleneterephthalate-based resin, or some combination thereof.

The first pattern 120 may be disposed on the base substrate 110. The first pattern 120 may include the driving line 121, the first sensing electrode 122 and the first dummy pattern 124. The first pattern 120 may include a transparent conductive material such as indium tin oxide (ITO) or any other suitable material.

The driving line 121 may be extended in the second direction D2. A scan signal may be applied to the driving line 121.

The first sensing electrode 122 may be electrically connected to the driving line 121. The first sensing electrode 122 may include branches extended from the driving line 121. A gap between the adjacent branches of the first sensing electrode 122 may be substantially the same as each other. A width of the adjacent branches of the first sensing electrode 122 may also be substantially the same as each other. For example, the gap of adjacent branches of the first sensing electrode 122 may be about 10 µm (micrometers) to about 20 µm. In addition or alternatively, the width of adjacent branches of the first sensing electrode 122 may be about 10 µm to about 20 µm.

The first dummy pattern 124 may be spaced apart from the driving line 121, and electrically disconnected from the first sensing electrode 122. The first dummy pattern 124 may include disconnected portions that are similar in width and spacing to the branches of the first sensing electrode 122. A gap between adjacent disconnected portions of the first dummy pattern may be about 10 µm to about 20 µm. In addition or alternatively, a width of the disconnected portions of the first dummy pattern 124 may be about 10 µm to about 20 µm.

The first dummy pattern 124 may include a center portion that is different from the other disconnected portions of the first dummy pattern 124. The center portion of the first dummy pattern 124 may have a polygonal shape such as a square as shown in FIGS. 2A and 2B or a non-polygonal shape (e.g., a circle or an oval). The center portion of the first dummy pattern 124 may be spaced apart from an adjacent disconnected portion of the first dummy pattern 124 the same distance that two adjacent disconnected portions of the first dummy pattern 124. In other words, the gap between the center portion and an adjacent disconnected portion of the first dummy pattern 124 may be about 10 µm to about 20 µm. However, a width of the center portion of the first dummy pattern 124 may be greater than a width of the disconnected portion of the first dummy pattern 124. For example, if the width of the disconnected portion of the first dummy pattern 124 is about 10 µm, then the width of the center portion of the first dummy pattern may be greater than about 10 µm. The width of the center portion of the first dummy pattern 124 may be about 11 µm to about 40 µm. The width of the center portion of the first dummy pattern 124 may be double the width of the disconnected portion of the first dummy pattern 124 (e.g., if the width of the disconnected portion is 15 µm, the width of the center portion is 30 µm). As an even further example, the center portion of the first dummy pattern 124 may be greater than about 40 µm.

The first insulation layer 130 may be disposed on the first pattern 120, and the first pattern 120 may be disposed on the base substrate 110, as described above. The first insulation layer 130 may be formed using an organic material. For example, the first insulation layer 130 may include a photoresist, an acryl-based resin, a polyimide-based resin, a polyamide-based resin, a siloxane-based resin, or some combination thereof. The first insulation layer 130 may use any suitable organic material. The first insulation layer 130 may have a substantially level surface.

The second pattern 140 may be disposed on the first insulation layer 130. The second pattern 140 may include the sensing line 141, the second sensing electrode 142, and the second dummy pattern 144. The second pattern 140 may include a transparent conductive material such as indium tin oxide (ITO) or any other suitable material.

The sensing line 141 may be extended in the first direction D1. A touch position may be determined by detecting capacitance sensing signal from the sensing line 141.

The second sensing electrode 142 may be electrically connected to the sensing line 141. The second sensing electrode 142 may include branches extended from the sensing line 141. A gap between the adjacent branches of the second sensing electrode 142 may be substantially the same as each other. A width of the adjacent branches of the second sensing electrode 142 may also be substantially the same as each other. For example, the gap of adjacent branches of the second sensing electrode 142 may be about 10 µm to about 20 µm. In addition or alternatively, the width of adjacent branches of the second sensing electrode 142 may be about 10 µm to about 20 µm.

The second dummy pattern 144 may be spaced apart from the sensing line 141, and electrically disconnected from the second sensing electrode 142. The second dummy pattern 144 may include disconnected portions that are similar in width and spacing to the branches of the second sensing electrode 142. A gap between adjacent disconnected portions of the second dummy pattern 144 may be about 10 µm to about 20 µm. In addition or alternatively, a width of the disconnected portions of the second dummy pattern 144 may be about 10 µm to about 20 µm.

As shown in FIG. 2A, the first dummy pattern 124 may disposed between the branches of the second sensing electrode 142 and the second dummy pattern 144 may be disposed between the branches of the first sensing electrode 122. For example, a disconnected portion of the first dummy pattern 124 may be disposed between two adjacent branches of the second sensing electrode 142. As another example, a disconnected portion of the second dummy pattern 144 may be disposed between two adjacent branches of the first sensing electrode 122.

The second insulation layer 150 may be disposed on the second pattern 140, and the second pattern 140 may be disposed on the first insulation layer 130, as described above. The second insulation layer 150 may be formed using an organic material. For example, the second insulation layer 150 may include a photoresist, an acryl-based resin, a polyimide-based resin, a polyamide-based resin, a siloxane-based resin, or some combination thereof. The second insulation layer 150 may have a substantially level surface.

In a plan view, one side of the first sensing electrode 122, the first dummy pattern 124, and/or the driving line 121 may be coincident with one side of the second sensing electrode 142, the second dummy pattern 144, and/or the sensing line 141. Thus, in a plan view of the unit area, there may be substantially no area where the first or second patterns 120 or 140 are not disposed. Thus, the reflectance difference between where a pattern is formed and where the pattern is not formed may not be noticed by the user. Accordingly, the display quality may be improved for a display apparatus having the touch panel of the above described exemplary embodiments.

In addition, an area where the first pattern 120 and the second pattern 140 are overlapped may be minimized. For example, a portion of the driving line 121 and a portion of the sensing line 141 may substantially overlap each other, the first sensing electrode 122 and the first dummy pattern 124 may not overlap each other, and the second sensing electrode 142 and the second dummy pattern may not overlap each other.

Although exemplary embodiments are described and illustrated with the first pattern 120 including the driving line 121 and the second pattern 140 including the sensing line 141, alternate exemplary embodiment include the first pattern 120 having the sensing line 141 and the second pattern 140 having the driving line 121.

In addition, although exemplary embodiment are described and illustrated with the driving line 121 extending in the second direction D2 and the sensing line 141 extending in the first direction D1, some exemplary embodiments include the driving line 121 extending in the first direction D1 and the sensing line 141 extending in the second direction D2.

Figure 4:
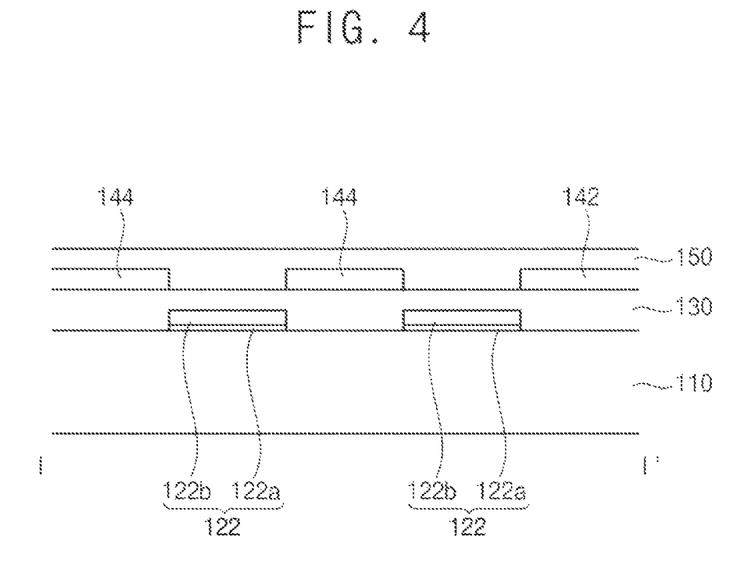
FIG. 4 is a cross-sectional view illustrating a touch panel according to an exemplary embodiment.

FIG. 4 is a cross-sectional view illustrating a touch panel according to an exemplary embodiment.

Referring to FIG. 4, the touch panel may be substantially same as the touch panel of FIGS. 2A, 2B, 2C, and 3, except for a first pattern 120. Thus, any further detailed descriptions concerning the same elements will be briefly described or omitted.

The touch panel may include a base substrate 110, a first pattern 120, a first insulation layer 130, a second pattern 140, and a second insulation layer 150. The first pattern 120 may include a first sensing electrode 122, a first dummy pattern 124 and a driving line 121. The second pattern 140 may include a second sensing electrode 142, a second dummy pattern 144, and a sensing line 141.

The first sensing electrode 122 may include a first sensing electrode layer 122a and a second sensing electrode layer 122b. The first sensing electrode layer 122a may be disposed on the base substrate 110. The second sensing electrode layer 122b may be disposed on the first sensing electrode layer 122a. The first sensing electrode layer 122a may include silver nano-wire (AgNW). The second sensing electrode layer 122b may include a transparent conductive material.

Here, the first pattern 120 which includes the first sensing electrode 122 may include the first sensing electrode layer 122a which includes AgNW. When the first pattern 120 and the second pattern 140 have the same thickness, the reflectance difference between the first pattern 120 and the second pattern 140 may be visible to users. Therefore, thickness of the first pattern 120 and thickness of the second pattern 140 may be different from each other to prevent this reflectance difference. The thickness of the second pattern 140 may be greater than the thickness of the first pattern 120.

Although FIG. 4 illustrates the first sensing electrode 122 with two layers, one of which includes AgNW, some exemplary embodiments includes a first sensing electrode 122 with one layer that includes AgNW. In addition, some exemplary embodiments include a first sensing electrode 122 with more than two layers. One layer or multiple layers of the first sensing electrode 122 may include AgNW. Furthermore, some exemplary embodiments include the second sensing electrode 142 that includes one or more layers with AgNW and the first pattern 120 having a thickness that is greater than the second pattern 140.

Figure 5:
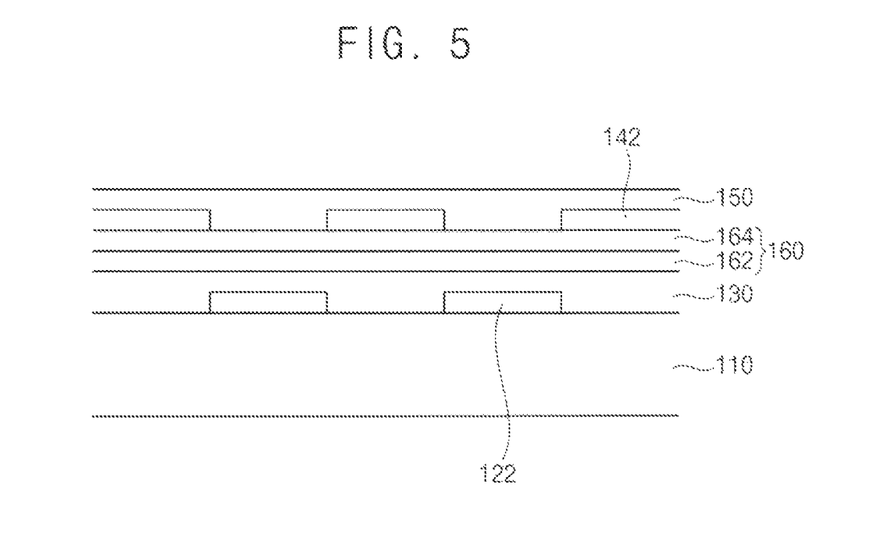
FIG. 5 is a cross-sectional view illustrating a touch panel according to an exemplary embodiment.

FIG. 5 is a cross-sectional view illustrating a touch panel according to an exemplary embodiment.

Referring to FIG. 5, the touch panel may be substantially same as the touch panel of FIGS. 2A, 2B, 2C, and 3, except for a reflective index matching layer 160. Thus, any further detailed descriptions concerning the same elements will be briefly described or omitted.

The touch panel may include a base substrate 110, a first pattern 120, a first insulation layer 130, a second pattern 140, a second insulation layer 150, and the reflective index matching layer 160. The first pattern 120 may include a first sensing electrode 122, a first dummy pattern 124, and a driving line 121. The second pattern 140 may include a second sensing electrode 142, a second dummy pattern 144, and a sensing line 141.

The reflective index matching layer 160 may be disposed between the first insulation layer 130 and the second sensing electrode 142. The reflective index matching layer 160 may be formed with a high reflectance layer 162 and a low reflectance layer 164. For example, the high reflectance layer 162 may be disposed on the first insulation layer 130 and the low reflectance layer 164 may be disposed on the high reflectance layer 162.

The high reflectance layer 162 may have a reflectance greater than that of the low reflectance layer 164. For example, the high reflectance layer 162 may include a niobium oxide such as niobium pentoxide ($Nb_2O_5$), and the low reflectance layer 164 may include silicon oxide such as silicon dioxide ($SiO_2$). (Overall reflectance of the touch panel may be lowered by the reflective index matching layer 160.

Although one high reflectance layer and one low reflectance layer are shown in FIG. 5, exemplary embodiments include the reflective index matching layer 160 having multiple high reflectance layers and/or multiple low reflectance layers. The high reflectance layers and the low reflectance layer may be alternatively stacked.

In addition, although the reflective index matching layer 160 is described and illustrated as being disposed between the first insulation layer 130 and the second sensing electrode 142, some exemplary embodiments include the reflective index matching layer 160 disposed at other positions.

Figure 6A:
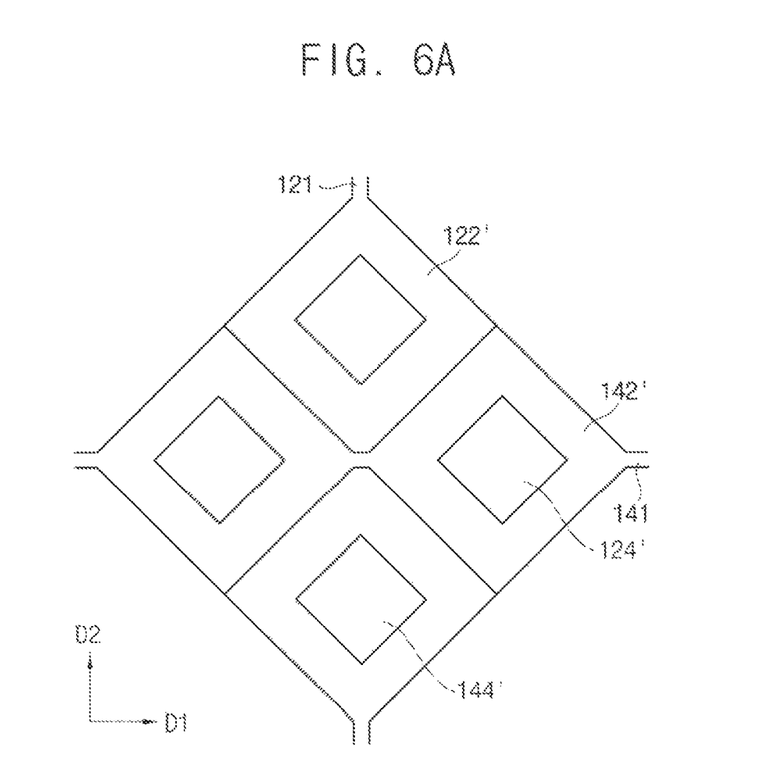
FIG. 6A is a plan view illustrating one unit area of a touch panel according to an exemplary embodiment.
Figure 6B:
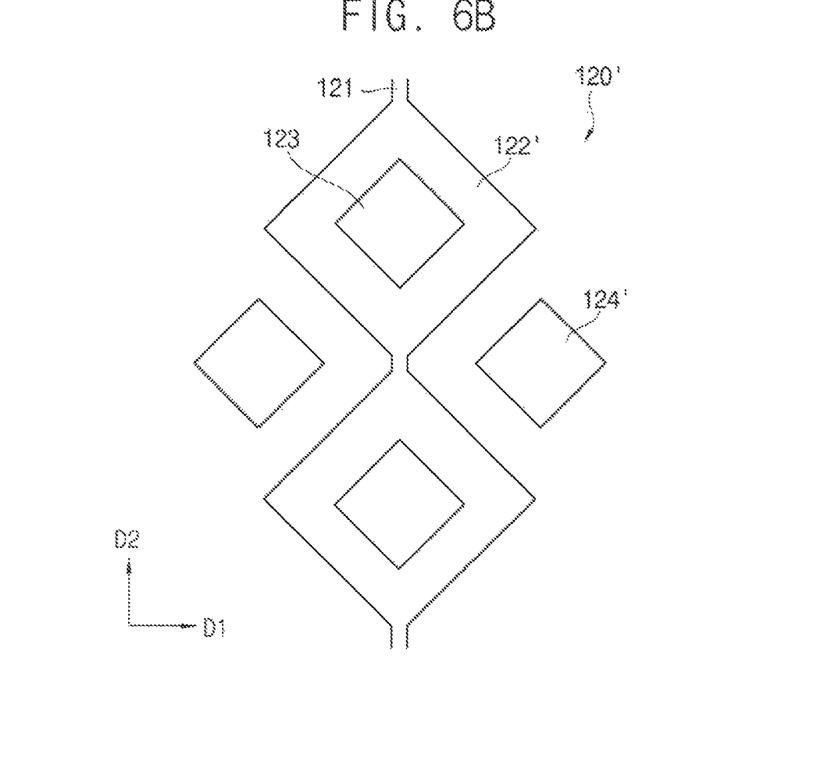
FIG. 6B is a plan view illustrating a first pattern of the touch panel of FIG. 6A.
Figure 6C:
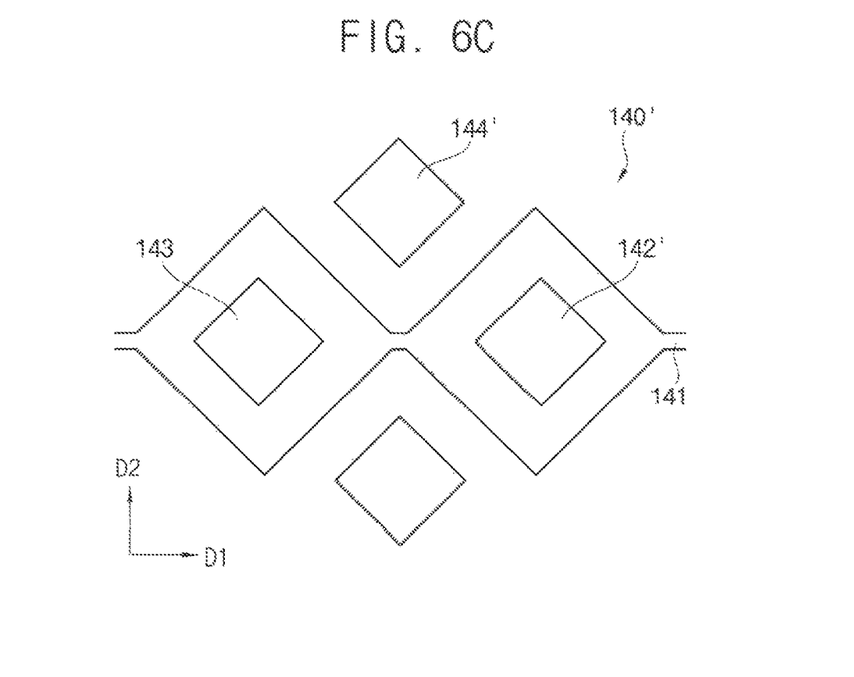
FIG. 6C is a plan view illustrating a second pattern of the touch panel of FIG. 6A.

FIG. 6A is a plan view illustrating a unit area of a touch panel according to an exemplary embodiment. FIG. 6B is a plan view illustrating a first pattern of the touch panel of FIG. 6A. FIG. 6C is a plan view illustrating a second pattern of the touch panel of FIG. 6A.

Referring to FIGS. 6A, 6B, and 6C, the touch panel may be substantially same as the touch panel of FIGS. 2A, 2B, 2C, and 3, except for shapes of the first and second patterns. Thus, any further detailed descriptions concerning the same elements will be briefly described or omitted.

The touch panel may include a base substrate 110 (not shown), a first pattern 120', a first insulation layer 130, a second pattern 140', and a second insulation layer 150. The first pattern 120' may include a first sensing electrode 122', a first dummy pattern 124', and a driving line 121. The second pattern 140' may include a second sensing electrode 142', a second dummy pattern 144', and a sensing line 141.

The driving line 121 may extend in a second direction D2 which crosses a first direction D1. The second direction D2 may be substantially perpendicular to the first direction D1. A scan signal may be applied to the driving line 121.

The first sensing electrode 122' may be electrically connected to the driving line 121. The first sensing electrode 122' may have internal edges that define a first opening 123. The second dummy pattern 144' may be disposed within the first opening 123. The first opening 123 may have a shape substantially the same as that of the second dummy pattern 144'. For example, the first opening 123 and the second dummy pattern 144' may have a regular polygonal shape (e.g., a square or a pentagon) or irregular polygon shape. As another example, the first opening 123 and the second dummy pattern 144' may have a regular non-polygonal shape (e.g., a circle or an oval) or an irregular non-polygonal shape.

The first dummy pattern 124' may be spaced apart from the driving line 121, and electrically disconnected from the first sensing electrode 122'.

The sensing line 141 may extend in a first direction D1. A touch position may be determined by detecting a capacitance sensing signal from the sensing line 141.

The second sensing electrode 142' may be electrically connected to the sensing line 141. The second sensing electrode 142' may have internal edges that define a second opening 143. The first dummy pattern 124' may be disposed within the second opening 143. The second opening 143 may have a shape substantially same as that of the first dummy pattern 124'. For example, the second opening 143 and the first dummy pattern 124' may have a regular polygonal shape (e.g., a square or a pentagon) or irregular polygon shape. As another example, the second opening 143 and the first dummy pattern 124' may have a regular non-polygonal shape (e.g., a circle or an oval) or an irregular non-polygonal shape.

The second dummy pattern 144 may be spaced apart from the sensing line 141, and electrically disconnected from the second sensing electrode 142.

In a plan view, one side of the first sensing electrode 122 or the first dummy pattern 124 may be coincident with one side of the second sensing electrode 142 or the second dummy pattern 144. Thus, in a plan view of the unit area, there may be substantially no area where the first pattern 120 or second pattern 140 is not disposed, so the reflectance difference between where a pattern is formed and where the pattern is not formed may be not be noticed by the user. Accordingly, the display quality may be improved for a display apparatus having the touch panel of the above described exemplary embodiments.

In addition, an area where the first pattern 120' and the second pattern 140' are overlapped may be minimized. For example, a portion of the driving line 121 and a portion of the sensing line 141 may overlap each other, the first sensing electrode 122' and the first dummy pattern 124' may overlap each other, and the second sensing electrode 142' and the second dummy pattern 144' may not overlap each other.

Although the first pattern 120' is described and illustrated to include the driving line and the second pattern 140' is described and illustrated to include the sensing line, some exemplary embodiments include the first pattern 120' having the sensing line and the second pattern 140' the driving line.

In addition, although the driving line is described and illustrated as extending in the second direction and the sensing line is described and illustrated as extending in the first direction, some exemplary embodiment include the driving line extending in the first direction and the sensing line extending in the second direction.

According to the present inventive concept, a touch panel may include a first pattern 120, 120' which includes a first sensing electrode 122, 122' and a second pattern 140, 140' which includes a second sensing electrode 142, 142'. In a plan view, there may be substantially no area where the first and second patterns 120 and 140 is not disposed, so that the reflectance difference between where a pattern is formed and where the pattern is not formed may not be noticeable to a user. In other words, the stain due to the reflectance difference between where a pattern is formed and where the pattern is not formed may not be noticeable to a user. Accordingly, the display quality may be improved for a display apparatus having the touch panel of the above described exemplary embodiments.

In addition, the touch panel may include a reflective index matching layer 160 to reduce reflectance. Accordingly, the display quality may be improved for a display apparatus having the touch panel of the above described exemplary embodiments.

Although certain exemplary embodiments and implementations have been described herein, other embodiments and modifications will be apparent from this description.

Accordingly, the inventive concept is not limited to such embodiments, but rather to the broader scope of the presented claims and various obvious modifications and equivalent arrangements.

What is claimed is:

1. A touch panel, comprising:
   a base substrate;
   a first pattern disposed on the base substrate, the first pattern comprising:
     a driving line extended in a second direction that crosses a first direction; and
     first sensing electrodes that are electrically connected to the driving line and arranged in the second direction;
   a first insulation layer disposed on the first pattern and the base substrate covering the first pattern;
   a second pattern disposed on the first insulation layer, the second pattern comprising:
     a sensing line extended in the first direction;
     second sensing electrodes that are electrically connected to the sensing line and arranged in the first direction; and
     a second insulation layer disposed on the second pattern and the first insulation layer covering the second pattern, and
   a reflective index matching layer disposed on the base substrate, the reflective index matching layer comprising a high reflectance layer and a low reflectance layer, wherein the reflective index matching layer is disposed between the first insulation layer and the second insulation layer such that the high reflectance layer contacts the first insulation layer,
   wherein a side of a first sensing electrode of the first sensing electrodes being coincident with a side of a second sensing electrode of the second sensing electrode.

2. The touch panel of claim 1, wherein:
   the touch panel further comprises unit areas that are arranged in the first direction and the second direction,
   a unit area of the unit areas comprises:
     two adjacent first sensing cells, each comprising the first sensing electrodes, and
     two adjacent second sensing cells, each comprising the second sensing electrodes, and
   the second pattern overlaps an area of the unit area where the first pattern is not formed.

3. The touch panel of claim 1, wherein:
the first sensing electrodes comprise first branches extending from the driving line, and
the second sensing electrodes comprise second branches extending from the sensing line.

4. The touch panel of claim 3, wherein:
the first pattern further comprises a first dummy pattern that is spaced apart from the first sensing electrodes,
the second pattern comprises a second dummy pattern that is spaced apart from the second sensing electrodes,
at least one side of the first dummy pattern coincides with at least one side of the second branches, and
at least one side of the second dummy pattern coincides with at least one side of the first branches.

5. The touch panel of claim 4, wherein:
the first dummy pattern is disposed between the second branches that are disposed adjacent to each other, and
the second dummy pattern is disposed between the first branches that are disposed adjacent to each other.

6. The touch panel of claim 3, wherein widths of the first branches and widths of the second branches are substantially equal to each other.

7. The touch panel of claim 6, wherein the widths of the first branches and the widths of the second branches are about 10 μm to about 20 μm.

8. The touch panel of claim 3, wherein the widths of the first branches and gaps between the first branches that are disposed adjacent each other are substantially equal.

9. The touch panel of claim 1, wherein the first pattern and the second pattern each comprise a transparent conductive material.

10. The touch panel of claim 9, wherein the first pattern comprises silver nano-wire.

11. The touch panel of claim 10, wherein a thickness of the second pattern is greater than a thickness of the first pattern.

12. The touch panel of claim 1, wherein the first insulation layer comprises an organic insulation material.

13. The touch panel of claim 12, wherein the first insulation layer has a substantially level upper surface.

14. The touch panel of claim 1, wherein:
the high reflectance layer comprises niobium oxide, and
the low reflectance layer comprises silicon oxide.

15. The touch panel of claim 1, the touch panel further comprises:
two first sensing cells disposed adjacent to each other in a unit area, each first sensing cell comprising the first sensing electrode; and
two second sensing cells disposed adjacent each other in the unit area and alternately arranged with the first sensing cell in a matrix form, each second sensing cell comprises the second sensing electrode,
the first and second patterns are disposed in the unit area to substantially cover the entire unit area.

16. A touch panel, comprising:
a first pattern comprising:
first sensing electrodes arranged in a second direction that crosses a first direction and electrically connected to each other along the second direction; and
first dummy patterns spaced apart from the first sensing electrodes; and
a first insulation layer disposed on the first pattern; and
a second pattern comprising:
second sensing electrodes arranged in the first direction and electrically connected to each other along the first direction;
second dummy patterns spaced apart from the second sensing electrodes, and
a reflective index matching layer disposed on the base substrate, the reflective index matching layer comprising a high reflectance layer and a low reflectance layer, wherein the reflective index matching layer is disposed between the first insulation layer and the second insulation layer such that the high reflectance layer contacts the first insulation layer,
wherein internal edges of the first sensing electrodes define first openings and first shapes of the first openings are coincident with the second dummy patterns, and
wherein internal edges of the second sensing electrodes define second openings and second shapes of the second openings are coincident with the first dummy patterns.

17. The touch panel of claim 16, wherein:
the second dummy patterns are disposed within the first openings, and
the first dummy patterns are disposed within the second openings.

* * * * *